United States Patent [19]

Topliffe

[11] 4,117,729
[45] Oct. 3, 1978

[54] INERTIAL MEASUREMENT DEVICE

[75] Inventor: Roger O. Topliffe, Amherst, N.H.

[73] Assignee: Sanders Associates, Inc., Nashua, N.H.

[21] Appl. No.: 842,705

[22] Filed: Oct. 17, 1977

[51] Int. Cl.² .............................................. G01P 15/08
[52] U.S. Cl. ............................................. 73/516 LM
[58] Field of Search ................. 73/515, 516 LM, 705, 73/753, 755; 250/231 R, 231 P

[56] References Cited

U.S. PATENT DOCUMENTS

| | | | |
|---|---|---|---|
| 2,666,650 | 1/1954 | MacDonell | 250/231 R |
| 3,002,390 | 10/1961 | Miller | 73/516 LM |
| 3,308,303 | 3/1967 | Weichselbaum et al. | 250/231 R |
| 3,479,886 | 11/1969 | Canfield | 73/516 LM |
| 3,908,460 | 9/1975 | Lichowsky | 73/705 |

*Primary Examiner*—James J. Gill
*Attorney, Agent, or Firm*—Louis Etlinger; Richard I. Seligman

[57] ABSTRACT

An inertial measurement device comprising a rotatable member having a fluid-filled chamber closed by a resilient member responsive to the forces acting on the fluid and a modulator coupled to the resilient member to alter the radiation from a light source to a detector depending upon the response of the resilient member.

9 Claims, 3 Drawing Figures

INERTIAL MEASUREMENT DEVICE

BACKGROUND OF THE INVENTION

There are applications wherein the low frequency signals of a measuring device which is located on a spinning member must be coupled to a stationary member. One class of such devices is disclosed in U.S. patent application Ser. No. 711,770 filed on Aug. 5, 1976, for "Apparatus and Method for Performing Inertial Measurements Using Translational Acceleration Transducers and for Calibrating Translational Acceleration Transducers" and assigned to the assignee of the present application. In that application there is disclosed inertial measurement devices for measuring angular velocity by spinning one or more translational acceleration transducers at least one of which is arranged parallel to the spin axis but not coincident therewith.

To obtain an output from the translational acceleration transducers requires an electrical path between a spinning member or rotor having the transducer disposed thereon and a non-spinning member, housing or stator. To transfer the electrical signals from a transducer on a spinning device to the stationary member necessitates the use of slip rings, commutators, capacitive or inductive couplings, or the like. Many of these methods of coupling are unsatisfactory in some respects in that certain of them introduce noise, are relatively complex, require many parts and/or lack accurate measurement resolution.

SUMMARY OF THE INVENTION

Accordingly, it is an object of this invention to provide an improved inertial measurement device.

It is another object of this invention to provide an improved inertial measurement device employing a hydraulic fluid transducer and optical means for measuring the inertial forces on such hydraulic fluid.

Briefly, in one embodiment an improved inertial measurement device comprises a rotating member having a fluid-filled chamber therein closed by a resilient member which reacts to inertial forces imposed on the fluid. A light source and a light sensor are arranged on the axis of said rotating member at opposite ends thereof. Means connected to the resilient member are disposed intermediate the light source and light sensor to interrupt the amount of light received by the light sensor from the light source depending upon the inertial forces imposed on the fluid and, thus, on the resilient member.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
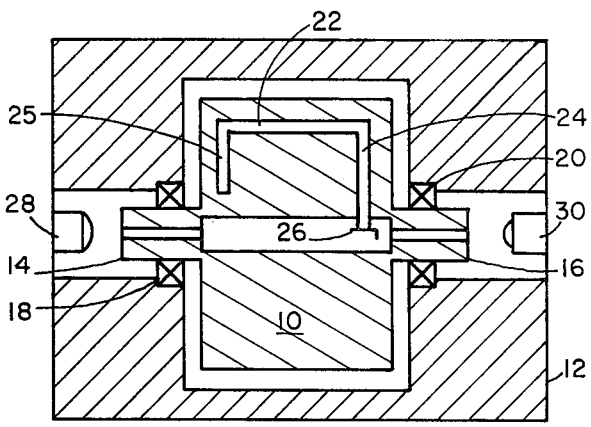
FIG. 1 is a sectional view of an inertial measurement device according to the invention.
Figure 2:
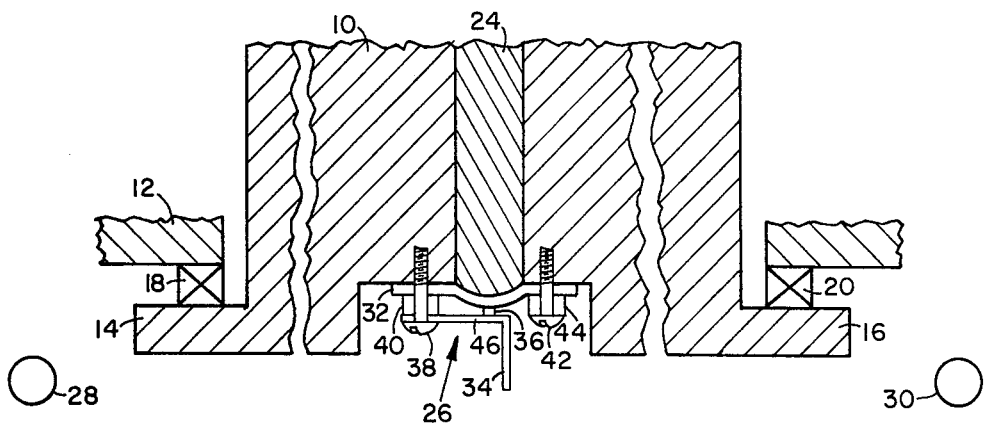
FIG. 2 is a sectional view of a portion of the inertial measurement device of FIG. 1 showing in greater detail the light modulator employed in the embodiment of FIG. 1.

A preferred embodiment of an inertial measurement device according to the invention is shown in FIGS. 1 and 2 of the drawings. It comprises a spinning member or rotor 10 disposed within a stationary member or stator 12 for rotation therein. The rotor 10 includes in this embodiment hollow shaft portions 14 and 16 which are arranged within bearings 18 and 20, respectively, for rotation therein. The hollow portions are made relatively small in diameter so as to columniate the output of the light source 30 to reduce spurious reflections. The rotating portion is driven, for example, by a motor. However, for purposes of clarity this is not shown.

A hollow chamber 22 is incorporated into rotor 10. Chamber 22 is arranged in parallel with the axis of rotation of rotor 10 but not along such axis. Chamber 22 has two portions 24 and 25 substantially equal in length and disposed orthogonal thereto. Chamber 22 has a fluid therein, preferably mercury. However, other high density fluids may be used, such as acetylene, tetrabromide, or bromoform. The function of portion 24 is to transfer the inertial forces acting on the fluid within the portion of chamber 22 parallel to the rotor spin axis. These forces are axial or Coriolis acceleration. The function of chamber 25 is to counteract the effects of centrifugal force or linear acceleration normal to the axis of rotation.

The magnitude of the axial or Coriolis acceleration forces are transferred outside the rotor by a light modulator 26 which modulates the amount of light received by a light sensor 28, such as a photoelectric cell or phototransistor, from a light source 30, such as a light emitting diode or incandescent lamp. It is not necessary that the light be in the visible region of the spectrum, and invisible radiation such as infrared could be used. One embodiment of the light modulator 26 is shown in greater detail in FIG. 2 of the drawings.

In this embodiment, a diaphragm 32 closes the end of chamber 24. A modulating member 34 is connected to diaphragm 32 via a connecting member 36. Preferably modulating member 34 is constructed of any rigid, light-weight material, such as beryllium, copper, stainless steel, or a rigid plastic. The left-hand end of modulator 34 is fixed to the rotor 10 by, for example, screwing it thereto using a screw 38 and a shim 40, the screw holding the modulator fixed to the stator and also fixing the diaphragm 32 thereto. It is obvious, of course, that the diaphragm could be affixed to the stator in other fashion, for example, by cementing it thereto, and need not be connected to the modulator 34. The other side of diaphragm 32 is connected to the rotor 10 via another screw 42 and shim 44.

The light modulator 34 is so constructed that it can pivot about a point 46. Hinge or pivot 46 should be close to but not at the point contact 36 so that a small motion of the point contact will result in a large motion at the end of the modulator 34. In the position shown it is seen that light modulator 34 blocks some of the light from the light source 30 from passing to the light sensor 28, and more or less of such light will be blocked depending upon the position of diaphragm 32, which position is directly related to the force on the fluid within chamber 22. As shown in the figure, the diaphragm is somewhat stretched from forces on the liquid in chamber 22, thus moving the modulator to the position shown cutting off some of the light from the external light source 30 to the light sensor 28. If additional forces were applied, the diaphragm would move outward from the chamber 24, thereby moving the light modulator further down, thereby cutting off more of the light from the external light source 30 to the external light sensor 28. Thus the fluid force on the diaphragm causes the light modulator to vary the amount of light to pass through the rotor shaft to the external light sensor.

Figure 3:
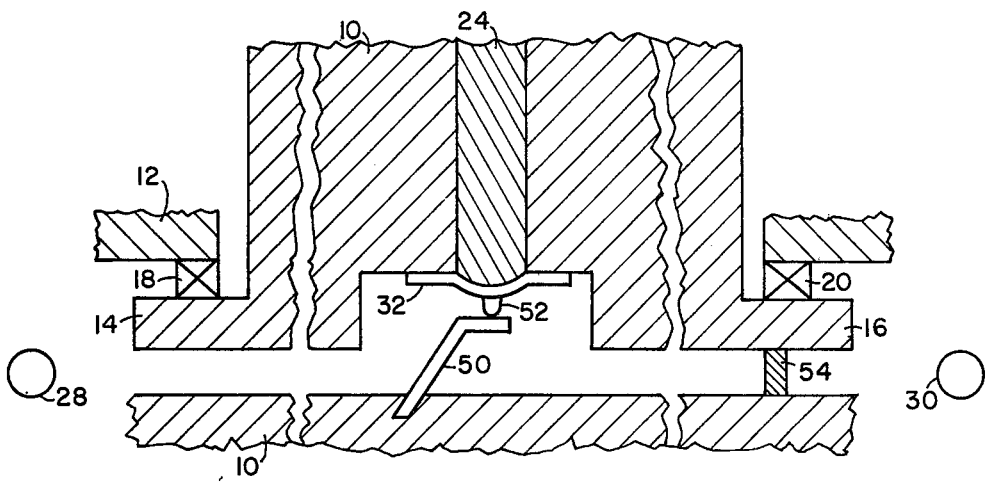
FIG. 3 is a sectional view of an alternate embodiment to the light modulating means of FIG. 2.

An alternate embodiment for the light modulator is shown in FIG. 3 of the drawings wherein the light modulator comprises a refringent material 50 which is rigidly mounted to rotor 10 and is coupled to the diaphragm 32 via a member 52. Typical refringent materials are optically clear materials, such as acrylic plastic, cellulose acetate, quartz, silicon, etc. Force on the fluid within chamber 22 causes deflection of the diaphragm 32 and a bending of the transparent refrigent member 50 which causes stress fringe patterns. Accordingly, the total light measured by a light sensor 28 is proportional to the force applied to the transparent refrigent member 50. In this embodiment a polarizing filter 54 is employed intermediate light source 30 and modulator 50.

While I have described above the principles of my invention in connection with specific apparatus, it is to be clearly understood that this description is made only by way of example and not as a limitation of the scope of my invention as set forth in the accompanying claims.

I claim:
1. An inertial measurement device, comprising:
   a stator;
   a rotatable member arranged for rotation within said stator and a fluid-filled chamber therein, said chamber located on an axis parallel to the axis of rotation of said rotatable member but not coincident therewith;
   resilient means coupled to said rotor and responsive to the inertial forces incident on said fluid;
   a source of radiation; and
   means coupled to said resilient means for modulating the output of said source of radiation.
2. Apparatus as defined in claim 1, wherein said modulating means includes means for intercepting a portion of the radiation emitted from said radiation source.
3. Apparatus as defined in claim 1, further including a photo-sensitive device disposed with respect to said radiation source for receiving the modulated output thereof.
4. Apparatus as defined in claim 3, wherein said radiation source and photo-sensitive device are arranged along the axis of rotation of said rotatable member.
5. Apparatus as defined in claim 4, wherein said rotatable member includes a hollow shaft portion, said radiation source and photo-sensitive device being disposed at opposing ends of said hollow shaft portion.
6. Apparatus as defined in claim 3, wherein said modulating means includes means for intercepting a portion of radiation emitted from said radiation source to said photo-sensitive device an amount proportional to the inertial forces on said fluid.
7. Apparatus as defined in claim 3, wherein said modulating means includes a refringent material disposed intermediate said radiation source and said photo-sensitive device.
8. Apparatus as defined in claim 7, further including means for bending said refringent material an amount proportional to the inertial forces on said fluid.
9. Apparatus as defined in claim 8, further including a polarizing filter disposed intermediate said radiation source and said refringent material.

* * * * *